United States Patent Office 3,493,468
Patented Feb. 3, 1970

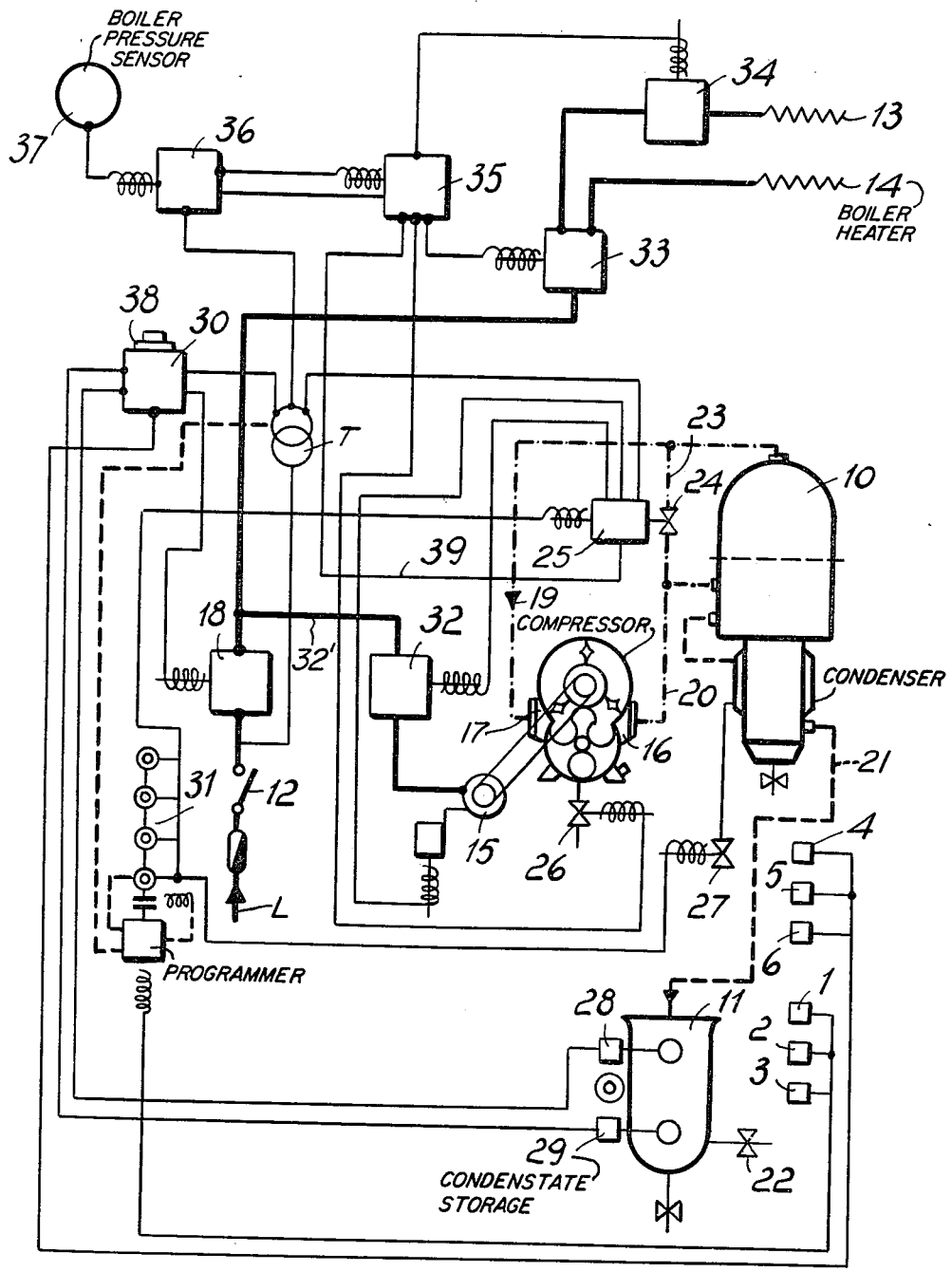

3,493,468
APPARATUS FOR AUTOMATIC STARTING AND CONTROL OF VAPOR COMPRESSION DISTILLATION
Federico Arcari, Soresina, Italy, assignor to Societa Ing. Giovanni Mascarini, Milan, Italy
Filed Mar. 10, 1967, Ser. No. 622,315
Claims priority, application Italy, Mar. 24, 1966, 6,571/66
Int. Cl. B01d 3/42
U.S. Cl. 202—160          1 Claim

ABSTRACT OF THE DISCLOSURE

An apparatus for automatic starting and control of distillation plants and the like comprising in combination with the still, a motor-driven aspirator-compressor, many detectors and elements sensitive to thermic or pressure values, an electric device to which are sent the signals of the above elements and which transmit control signals to the various switches and servo-relays controlling the various operations.

---

It is known that in modern stills or concentrators, it is necessary, at start up, to bring up to boiling temperature the fluid mass contained in the boiler, which requires in each of the production periods, a pre-stage of preparation to working, preparation that up to now has always required a human presence, because of the several operations required.

Presently, the presence of manual operators is indispensable, not only in the initial preparation phase, but also in the starting operation itself and in the stopping of the plant, as well as after temporary power failures.

Up to now, it has not been considered possible to make the restarting of the still or concentrator plant depend on exhaustion of distilland or concentrated solution, always because of the aforementioned many operations, unavoidable for putting the plants on steam, when they start up.

The above stated main difficulties, plus other complications, have up to now convinced the constructors of such plants, especially those of distillation, of the impossibility of automizing all operations.

Accordingly, it is an object of the present invention to provide for the full automation of distillation apparatus.

Other objects and advantages of the invention will become apparent from a consideration of the following description, considered in connection with the accompanying drawing, which schematically illustrates a water distillation plant controlled according to the present invention.

In the drawing, 10 indicates schematically the still 11 the storage tank, or the reserve tank or the distilled water deposit tank, 12 the master switch with fuses or similar protection devices, inserted in line L, of the electric power supply.

In the drawing, the dark continuous lines indicate the electric mains that feed the resistors 13 and 14 of the still or boiler and those which go to the engine 15 of compressor-aspirator 16–17. The light continuous lines indicate the electric circuitry from the various control and command devices, while the intermixed lines and points indicate the liquid mains.

From switch 12, the electric line feeds the transformator T, the secondary of which supplies power to all control coils of relays, switches and commutators, while another branch of same, through the breaker 18, telecontrolled by control signals of plant operation, controls the feeding of abovementioned heaters and of the engine 15, through other control switches, as will be better explained below.

The still 10 has on its top a steam outlet that, through main 19 sends steam to aspirator-compressor 17–16 and thence the compressed steam, through main 20 is sent to the condenser, incorporated in the still and the steam so condensed is sent through main 21 to the storage tank 11 of distilled water.

From here, the distillate is withdrawn for the various uses to which it is destined, through a main 22.

The two steam mains 19 and 20 are connected the one with the other by a by-pass main 23 that is in shunt with compressor-aspirator 16–17, and controlled by a valve 24 controlled by a relay device 25 actuated by control and signals, sent by other control devices, as will better appear below.

26 and 27 indicate two electric remotely controlled valves that control respectively the drainage of the compressor and the discharge of the concentrated solution from the still.

1, 2 and 3, indicate diagrammatically elements that are sensible to differences in thermic values, combined with the still and which are in contact with active areas, at characteristic points or immersed in the fluid to be distilled, and have the aim of transmitting such thermic values to the devices of automatic control of plant operation.

Of course the elements responsive to temperature differences, utilized in the plant, may be of a number different from three. In the case of the example illustrated, said responsive elements 1, 2 and 3 can be placed respectively: in the boiler of still 10, in steam compressor 16, and in one of the conduits 19 and 20.

4, 5 and 6 indicate elements that are sensitive to differences in pressure or in level at various characteristic points of the still and that are able to signal such values to the devices which control automatically the plant operation.

The number of the elements responsive to pressure differences too could be diverse from three, and the characteristic points to place them may be: the steam dome and the boiler of the still 10 and the feeding and exhaust conduits thereof.

28 and 29 indicate minimum and maximum level indicators respectively in the tank 11, connected as well with an automatic control device for the devices previously considered. In the case depicted, the indicators 28 and 29, as well as those indicated at 4, 5, and 6, are connected to a switch 30 capable of controlling the plant operation and effecting automatic locking when, for external reasons, the fluid to be distilled is not available or the heater means is not operative or when the aspirator-compressor engine is overloaded or in case of breakdown or the like.

More precisely, the indicators 28 and 29, and the other elements responsive to abnormal conditions at some places in the plant, not shown in the drawing for the sake of simplicity, control by means of switch 30 and control 31, some variations of the actuation of the electric devices for heating and controlling other elements of the plant apparatus, besides the disconnection of the electric devices which cause the start up, and the control of those adapted to interrupt the production of the distillate at shut down.

Particularly switch 30 is so arranged as to intervene and carry out the whole shutdown of the plant in the case there takes place serious malfunction which could jeopardize the regular functioning of the plant, such as: lack of water feeding the still 10, too high a vacuum or a pressure because of shortcomings as to the heating units, overload on motor 15 and the like.

Such an intervention of switch 30 happens, as has already been set forth, by means of devices responsive to water level (28 and 29), to the pressure (4, 5, 6) at predetermined places in the plant, and so on.

31 indicates the cycle control or programmer that, in the case depicted is of the cam type, for compressor-aspirator starting and for the slow moving of valve 24 which during starting of the compressor must be open but should then close slowly, when the compressor is heated before the plant is put on stream.

In the electric line feeding the engine 15 that drives the compressor-aspirator 17–16 is connected a switch 32, remotely controlled and sensitive to control and condense signals. In the line feeding the resistance 13 and 14, heating the water to be distilled is connected another breaker 33 remotely controlled as well, in accordance with the temperature of the various plant elements. The electric line that feeds the resistance 13 is again by the breaker 34 which automatically controls the circuit through resistance 13, during operation when the temperature or the pressure at some point in the plant reaches or exceeds the predetermined values.

The control impulses for the breakers 33 and 34 are sent to same by the commutator 35, this commutator being controlled by the differences in the temperatures of the various devices, and being able to control the automatic passing of the plant from the predisposition phase to that of effective starting. 36 indicates a servo-relay which controls the phase of automatic operation of the plant, and its action is controlled by the differences in pressure values by a special device 37 sensitive to such differences and disposed on the evaporator.

The operation of the plant hereby described and shown schematically in the drawing and that has been supposed to obtain distilled water, will be now considered more in detail with particular reference to electrical control and driving apparatus.

Let us suppose the plant stopped because the distilled water tank 11 has reached its maximum level. When distilled water is almost used up the level in 11 will have gone down to the minimum and the minimum level indicator device 29 will act on the commutator 30 which, the master switch 12 being closed, will send current to the electric switch 18 that will close, sending current to the remotely controlled switches 32 and 33.

The by-pass valve 24, is closed by the action of device 25 that orders to commutator 35 to dispose the connection of resistances 13 and 14 for the greatest heating action. The device 25 combined with the abovementioned valve 24 locks in the position "off" the remotely controlled switch 32 which controls the starting of compressor-aspirator 15–16–17, through the device 31, also the opening of the electro-valve 26 for discharging the condensates that will flow from the abovementioned aspirator-compressor, when the heating means is actuated in the first phase of heat supply.

More precisely, commutator 35 has the duty of controlling the electric power fed into the heating elements of the boiler which, in the example shown, are comprised by resistors 13 and 14. Such a control is effected by means of commutator 35 through a selective action and through a coupling action, by means of remote control breakers 33 and 34. Stated more precisely, the selective action is carried out by the cycle control 31, through a cam and contacts, as has already been set forth. The coupling action is instead controlled by the device 25.

Indeed, as illustrated in the diagram of the drawing, the remote control breakers 33 and 34, controlled by commutator 35, provide for connecting and disconnecting the heating elements (in the case considered, resistors 13 and 14) so as to supply the boiler of still 10 with suitable heat, in each of the steps of initial prearrangement, starting and on stream operation.

Commutator 35 controls breakers 33 and 34 according to control orders coming from cycle control 31 and device 25 which behaves in such a way that in the step of initial heating and in the step of starting, both resistors 13 and 14 are actuated, whereas in the phase of steady condition functioning, and at time intervals, there will be acted on, breaker 34 for the connection of heating elements 13, when the thermal conditions of the plant require such an operation.

Commutator 35 also acts, at the proper time, on valve 26 exhausting the liquid containing the concentrated contaminants.

Said commutator 35 is controlled too by regulator 36, for on stream automatic functioning.

Regulator 36 is comprised of different relays actuated by differential pressures even very small, which take place in 10 and are indicated by gauge device 37 on boiler 10.

When either in the boiler of still 10 or in the heat exchanger—not illustrated in the drawing because they are not characteristic of the present invention—the prefixed thermic levels will be reached, the thermically sensitive elements, like those indicated at 1, 2 and 3 and situated at proper points of the still, will order the suspension of the phase of preparation for start up, to begin the starting itself.

More precisely, indicators 1, 2 and 3 will act on control 31 which will have been brought in the position "ready" in the previous preparation phase and it will begin to move and within 2 minutes (in the example contemplated) it will effect, through 25, the operation of opening the valve 24 and the closing of discharge valve 26 of condensates coming from the aspirator-compressor 16–17. When the valve 24 will have been completely opened, the abovementioned low speed starting of the aspirator-compressor 17 will begin.

The cycle control 31, after having received the signal from temperature-sensitive elements 1, 2, and 3, will order the very slow closing of valve 24, through 25, reclosing which will terminate in a predetermined time. The control 31—continuing its movement will put in position "automatic working" the commutator 35 that controls actuation of resistors 13 and 14 necessary in the heating phase of the water in the still 10.

The control 31 will also open the electro-valve 27 for discharge of concentrated fluid, that is of such a portion of fluid in which salts and impurities contained in the mass of evaporated fluid have been collected in concentrated proportions.

The plant has thus arrived to the phase "automatic working" in which it will practically remain, until the maximum level in the distilled tank 11 is reached. During this period some automatic adjustments may take place, as will be stated further on.

In such an automatic cycle, the vacuum gauge 37, with electric contacts and in communication with the still steam chamber 10, will through breakers or commutators 36, 35 and 34, connect or disconnect heating means—in this case resistance 13—with the aim of maintaining in the boiler the prefixed temperature necessary to ensure that the optimum conditions of operation remain constant. More exactly, such vacuum gauge 37, is influenced by differential pressure values, detected in the still boiler and has such a sensitivity as to be able to maintain, through controls by means of a servo-relay, and of the abovementioned heating elements, a practically constant pressure in the boiler, so that the distillation cycle will be able to regularly continue for an indefinite time if the distilled water consumption is such as to never reach, in tank 11, the maximum level.

However, when such maximum level in tank 11 is reached, the float control device 28 will transmit the associated signal to the automatic locking commutator 30, and as master switch 12 is already closed, it will cause current to pass the coil of the electromagnet controlling breaker 18, which will close and send in turn current to the controls 32 and 33. Device 32 through line 32' feeds and causes the device 25 to move which in this way causes the valve 24 to open in this initial phase so that steam prepares compressor 16–17 by heating it. Device 25, through line 39, in the meantime will have sent to commutator 35 the necessary control for prearranging its contacts in such a way as to allow the feeding of the heating resistors 13 and 14, which in the diagram of the drawing are shown at some other position in the drawing, whereas they are really inside the boiler of still 10.

Device 25 combined with valve 24 blocks in the meantime on "not starting" telecontrol 32 which controls the starting of compressor-aspirator 15–16–17, inasmuch as such starting has to take place only after the water of the boiler of still 10 has been heated and converted partly into steam and after compressor 16–17 has been heated.

By means of device 25, there takes place too the opening of valve 26 exhausting the condensates which will flow out from the aspirator-compressor in the first phase of supplying heat.

The plant may however be automatically stopped also for other reasons, such as: lack of fluid to distill, or of heating means, the creation of a dangerous overload on engines. In fact, indicators of such external causes, known and therefore neither described nor illustrated, would act in similar cases on the commutator 30 which would transmit stop orders, as in the case contemplated hereinbefore, of maximum level in tank 11, but in a definite way as will be further explained.

Of course, as usual in such plants, manual controls are available, that enable the independent operation either of heaters or of aspirator-compressors for possible checking of the single elements.

In case stopping of the plant has been provoked by one of the above external causes or by a breakdown it will not be possible for the plant to restart automatically but resumed operation will be possible only by removing the cause of stoppage and by pushing and push-button 38 to resume of automation.

From the above description, it is clear by fitting a still with an electric starting and control apparatus as described, it is possible to obtain a completely automatic operation of the whole plant, so that once the initial signal for starting has been given (the closing of master switch 12 in the illustrated embodiment) with the tank 11 empty, then the subsequent operations discussed above will ensue automatically.

A great advantage of the invention, therefore, is that the attention of an operator is no longer needed, either in the initial phases or when the plant is on stream, but only in the case of a breakdown.

Modifications and variations may be made without departing from the spirit or scope of the invention as defined by the appended claim.

1. Distillation apparatus comprising a still having a boiler for the production of steam and a condenser in indirect heat exchange with said boiler for condensing said steam, a storage container for condensate from the compressor, heating means for the boiler of the still, a compressor for compressing said steam, said compressor having an intake and an outlet, first conduit means from said boiler to said compressor intake for conveying steam to the compressor, second conduit means from said compressor outlet to said condenser for conveying compressed steam to said condenser, by-pass conduit means communicating between said first and second conduit means to divert steam from said second to said first conduit means thereby to recycle steam through the compressor to heat the compressor during a preparatory period that precedes on-stream operation of said apparatus, a valve to open and close said by-pass conduit means, electric power means for opening and closing said valve, means actuating said electric power means to maintain said valve open during said preparatory period, temperature-sensitive means responsive to a temperature in said apparatus characteristic of said on-stream operation to actuate said electric power means to close said valve thereby to discontinue said recycle of steam through the compressor and to send all the compressed steam in said second conduct through said condenser, means responsive to the pressure in the boiler for actuating said heating means, and means responsive to the level of liquid in said storage container for actuating said compressor and said heating means.

References Cited

UNITED STATES PATENTS

| | | | |
|---|---|---|---|
| 1,379,631 | 5/1921 | Kells | 203—1 |
| 2,441,361 | 5/1948 | Kirgan | 202—160 |
| 3,055,810 | 9/1962 | Skow | 203—2 |
| 3,235,469 | 2/1966 | Parke | 203—2 |
| 3,269,919 | 8/1966 | Baily et al. | 202—160 |
| 3,311,543 | 3/1967 | Loebel | 202—160 |
| 3,312,600 | 4/1967 | Morton | 202—160 |
| 3,324,009 | 7/1967 | Griffith et al. | 203—1 |
| 3,338,798 | 8/1967 | Parr | 203—26 |
| 2,476,280 | 7/1949 | Bragg et al. | 202—160 |
| 2,643,216 | 6/1953 | Findlay | 202—160 XR |
| 2,692,820 | 10/1954 | Alway et al. | 202—160 |
| 3,094,468 | 6/1963 | Topham | 202—160 |

WILBUR L. BASCOMB, JR., Primary Examiner

U.S. Cl. X.R.

202—202, 206; 203—1, 2, 26, 11